United States Patent
Kinoshita et al.

[11] Patent Number: 5,601,167
[45] Date of Patent: Feb. 11, 1997

[54] ONE-WAY CLUTCH

[75] Inventors: Yoshio Kinoshita; Tatsuo Suzuki; Hirobumi Shirataki, all of Shizuoka-ken, Japan

[73] Assignee: NSK-Warner K.K., Tokyo, Japan

[21] Appl. No.: 502,127

[22] Filed: Jul. 13, 1995

[30] Foreign Application Priority Data

Jul. 15, 1994 [JP] Japan ................... 6-194497

[51] Int. Cl.⁶ .................................. F16D 41/069
[52] U.S. Cl. .................. 192/45.1; 192/41 A; 188/82.8
[58] Field of Search ............... 192/45.1, 41 A; 188/82.8

[56] References Cited

U.S. PATENT DOCUMENTS

| | | |
|---|---|---|
| 2,912,086 | 11/1959 | Troendly et al. . |
| 3,545,581 | 12/1970 | Kent . |
| 4,089,395 | 5/1978 | Fogelberg . |
| 5,454,458 | 10/1995 | Ito ........................... 192/45.1 |

FOREIGN PATENT DOCUMENTS 1-169130   7/1989   Japan .

Primary Examiner—Andrea L. Pitts
Attorney, Agent, or Firm—Evenson, McKeown, Edwards & Lenahan, P.L.L.C.

[57] ABSTRACT

A one-way includes a drag strip between a retainer and a driver ring to ensure transmission of rotation of the driver ring to engagement members such as sprags even when the driver ring is abruptly accelerated or is driven at a high speed. The drag strip has a sliding main body which, after assembly of the drag strip in the one-way clutch, is maintained in contact with the driver ring. The drag strip also has a hanger which extends at a right angle from at least one of opposite ends of the sliding main body into an engagement-member-receiving window of the retainer. On a side edge of the drag strip, where the drag strip is normally maintained in contact with an edge of the engagement-member-receiving window of the inner retainer, the drag strip has an engagement portion engageable with the edge the engagement-member-receiving window. The engagement portion is located in the same plane as the side edge of the hanger. The hanger is maintained in engagement with the retainer by the engagement portion.

5 Claims, 5 Drawing Sheets

ONE-WAY CLUTCH

BACKGROUND OF THE INVENTION (i) Field of the Invention

This invention relates to a one-way clutch having a drag strip or the like.

b) Description o f the Related Art

A sprag-synchronized one-way clutch is constructed inter alia of an outer ring having an annular inner wall, an inner ring having an outer wall concentrically disposed in relation to the inner wall, a plurality of sprags arranged in an annular space formed between these inner and outer walls, an outer retainer and inner retainer for holding these sprags at predetermined positions, and a ribbon spring for applying such force as maintaining the sprags in contact with the outer and inner rings.

In such a one-way clutch, fictional force applying means such as a drag strip is arranged between a driver ring, for example, the inner ring and the inner retainer so that rotation of the inner ring can be surely transmitted to the sprags even when the inner ring is abruptly accelerated or is driven at a high speed.

This drag strip is attached to the inner retainer the one-way clutch and, when the inner ring as driver ring is inserted, a central flat strip portion is flexed to contact the inner ring under predetermined force. The drag strip therefore transmits drag torque to in the order of the drag strip, the inner retainer and the sprags so that engagement of the one-way clutch is ensured while reducing wearing of the sprags.

One example of the construction of a sprag one-way clutch is illustrated in FIG. 3. A one-way clutch 10 is equipped with sprags 3, which are held by an outer retainer 4 and an inner retainer 5 both arranged between an outer ring and an inner ring 2. Designated at numeral 6 is a ribbon spring which acts to maintain the sprags 3 in contact with the inner and outer rings.

Numeral 20 indicates a drag strip, which is attached to the inner retainer 5 by hangers 23. A sliding main portion 21 is provided with bent portions 22 and is maintained in adequate frictional contact with the inner ring 2 under spring force. When the inner ring 2 idles in a direction indicated by arrow A, the drag strip 20 accordingly transmits drag torque in the order of the drag strip 20, the inner retainer 5 and the sprags 3 so that the sprags 3 are caused to turn in a direction indicated by arrow B. As a result, the sprags 3 are tilted toward an idling side and the contact pressure between the sprags 3 and the inner ring 2 is hence lowered. This can reduce wearing of the sprags 3 upon idling. When the inner ring 2 rotates in the opposite direction, the resulting frictional force which acts on the drag strip 20 is also reversed in direction. The inner retainer 5 therefore pushes the sprags 3 into up eight positions, thereby surely bringing the sprags 3 into full engagement with the inner and outer rings 2,1.

Only a conventional drag strip 20 and the inner retainer 5 are i illustrated in FIG. 4. FIG. 5 is a side view of a hanger 23 of the conventional drag strip, while FIG. 6 is a schematic view illustrating the state of attachment of the hanger 23 on the inner retainer 5. The hanger 23 is formed integrally with the sliding main body 21 and, when observed in cross-section together with the sliding main body 21, presents a turned square U shape. As is depicted in FIG. 6, the hanger 23 is attached to the inner retainer 5. Incidentally, numeral 51 indicates a sprag window formed in the inner retainer 5 to accommodate one of the sprags 3 therein.

In the case of such a drag strip, an end portion of the sliding main body 21 hits the inner wall of the inner retainer 5 whenever the one-way clutch is engaged or disengaged, as shown in FIG. 7. A portion indicated by arrow a in FIG. 7 is therefore caused to wear out, resulting in occurrence of corner-to-corner contact between an upper wall of the turned square U-shaped hanger 23, said upper wall being indicated at letter b, and an upper wall of the inner retainer 5. This leads to concentration of stress on a bent portion of the hanger, said bent portion being indicated by arrow c, so that the drag strip may be broken there.

SUMMARY OF THE INVENTION

An object of the present invention is to provide a one-way clutch having a drag strip which is substantially free of the above problem.

In one aspect of the present invention, there is thus provided a one-way clutch having engagement members, such as sprags, for transmitting drive force from one of an outer ring and an inner ring to the other, an inner and outer retainers holding said engagement members in place, a clutch member, such as a ribbon spring, for selectively maintaining said engagement members in contact with an annular outer wall of said inner ring and an annular inner wall of said outer ring, and a drag spring. The engagement members, inner and outer retainers, clutch member and drag spring are all disposed between said annular outer wall of said inner ring and said annular inner wall of said outer ring. The drag strip comprises:

a sliding main body for being brought into contact with said annular outer wall of said inner ring, and a hanger extending at a right angle from at least one of opposite ends of said sliding main body into an engagement-member-receiving window of said inner retainer and, on a side edge normally maintained in contact with an edge of said engagement-member-receiving window of said inner retainer, having an engagement portion engageable with said edge of said engagement-member-receiving window, said engagement portion being located in the same plane as said side edge of said hanger, whereby said hanger is maintained in engagement with said inner retainer by means of said engagement portion.

Owing to the above-described construction of the drag spring employed in the one-way clutch according to the present invention, the drag spring can be easily attached to the inner retainer and can avoid breakage at the portion of the hanger during use.

DETAILED DESCRIPTION OF THE INVENTION AND PREFERRED EMBODIMENT

Figure 1:
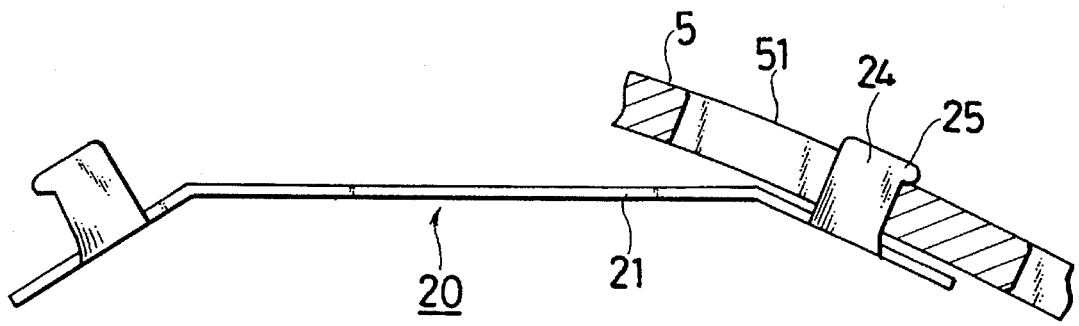
FIG. 1 is a front view of a drag strip in a one-way clutch according to one embodiment of the present invention, in which a part of an associated inner retainer is also shown.
Figure 2:
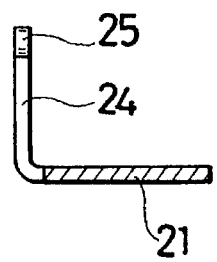
FIG. 2 is a side view of a hanger of the drag strip depicted in FIG. 1.

Referring first to FIGS. 1 and 2, the drag strip in the one-way clutch according to the first embodiment of the present invention will be described. The drag strip is designated by numeral 20 in FIG. 1. The drag strip 20 comprises a sliding main body 21 and hangers 24 arranged at opposite end portions of the sliding main body 21, respectively. As these hangers 24 are identical to each other except for the extending directions of their engagement portions 25 which will be described subsequently herein, only one of the hangers 24 will hereinafter be described. The hanger 24 extends at a right angle from the corresponding end portion of the sliding main body 21 into a sprag window 51 formed as an engagement-member-receiving window in the inner retainer 5.

Since the hanger 24 of the drag strip 20 in the one-way clutch according to the one embodiment of the present invention does not have any top wall, no corner-to-corner contact takes place between the hanger 24 and the inner retainer 5 even if the end portion of the sliding main body 21 wears out.

From a side edge of the hanger 24, said side edge being normally maintained in contact with an edge of the sprag window 51, the engagement portion 25 extends out in an angular direction of the inner retainer 5. The engagement portion 25 is located in the same plane as the side edge of the hanger 24. The engagement portion 25 is in engagement with the edge of the sprag window 51, where by the hanger 24 is maintained in engagement with the inner retainer 5 by means of the engagement portion 25.

Figure 3:
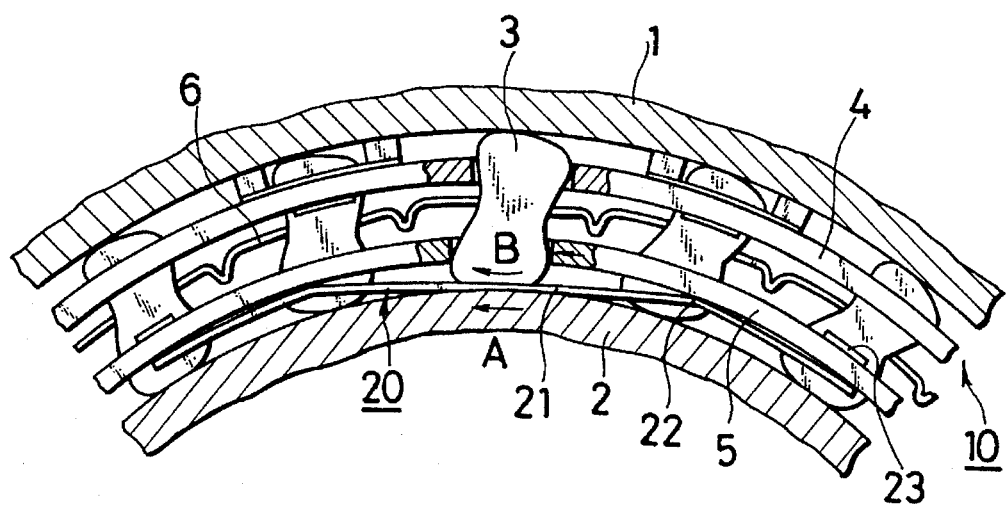
FIG. 3 is a fragmentary rear view showing the construction of a typical one-way clutch.
Figure 4:
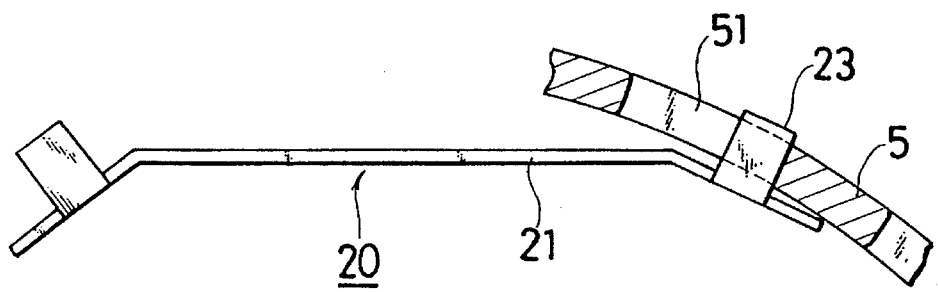
FIG. 4 is a front view of a drag strip in a conventional one-way clutch, in which a part of an associated inner retainer is also shown.
Figure 5:
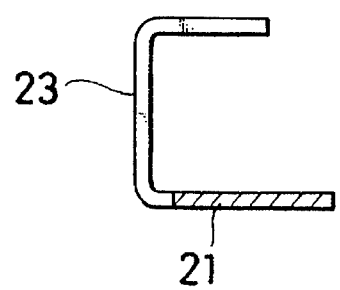
FIG. 5 is a side view of a hanger of the drag strip depicted in FIG. 4.
Figure 6:
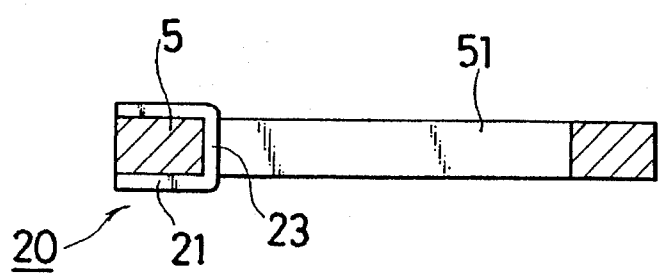
FIG. 6 is schematic illustration showing the state of attachment of the hanger, which is depicted in FIG. 5, to an associated inner retainer.
Figure 7:
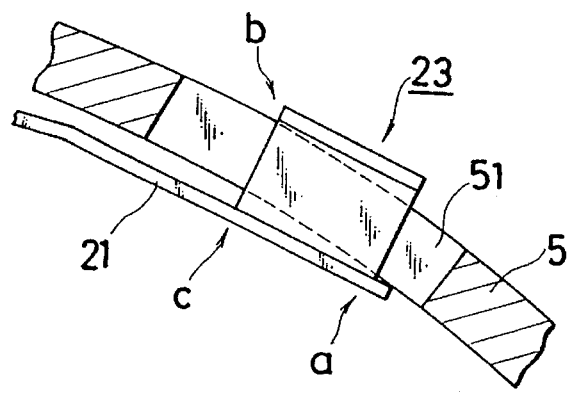
FIG. 7 is a schematic illustration showing a drawback of the conventional drag strip depicted in FIG. 4.
Figure 8:
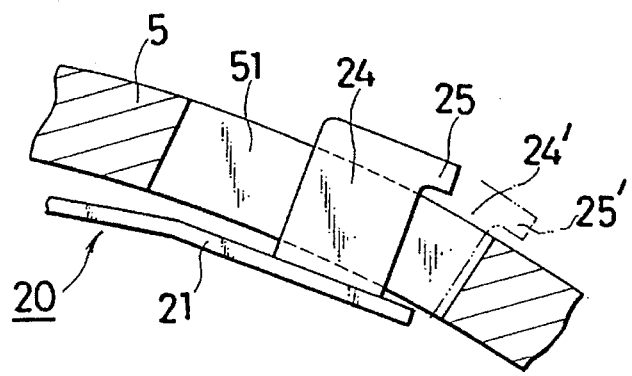
FIG. 8 is a schematic illustration showing the state of attachment of the hanger, which is depicted in FIG. 2, to the associated inner retainer.

Reference is now had to FIG. 8. As will be described subsequently herein, the drag strip 20 is in the position indicated by solid lines after the clutch assembly has been assembled on the inner ring. Before its assembly on the inner ring, however, the hanger takes the position indicated by broken lines 24' to maintain the engagement portion 25' in engagement with the edge of the sprag window 51 so that the drag strip 20 is prevented from being detached from the inner retainer 5 under the action of the ribbon spring 6 (see FIG. 3).

In the first embodiment depicted in FIG. 8, an engagement portion 25 extends in a direction away from the drag strip 20 (namely, clockwise as viewed in FIG. 8). Various modifications of the engagement portion 25 will hereinafter be described with reference to FIG. 9 to FIG. 13.

Figure 9:
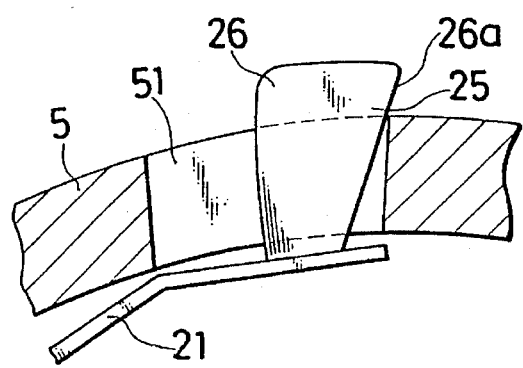
FIG. 9 shows a first modification of the hanger depicted in FIG. 2.

In the first modification depicted in FIG. 9, an outer side edge portion 26a of a hanger 26 extending through the sprag window 51 is tilted so that the tilted outer side edge portion 26a can be brought into engagement with the edge of the sprag window 51.

Figure 10:
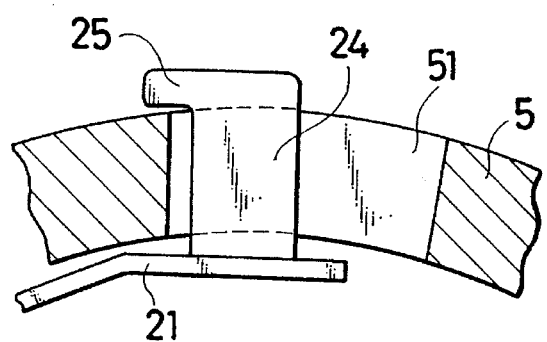
FIG. 10 shows a second modification of the hanger depicted in FIG. 2.

In the second modification depicted in FIG. 10, an engagement portion 25 of a hanger 24 in the sprag window 51 extends in a direction opposite to the extending direction of the engagement portion 25 in FIG. 8, that is, toward a center of the drag strip 20.

Figure 11:
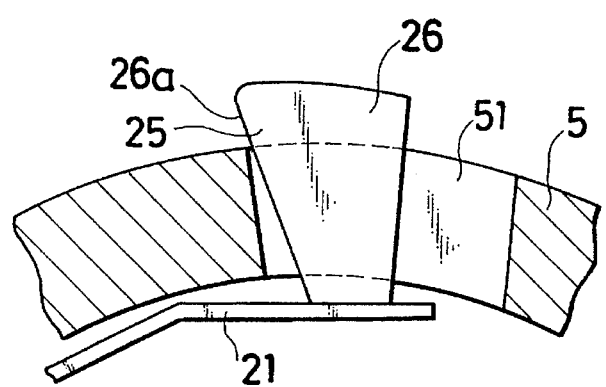
FIG. 11 shows a third modification of the hanger depicted in FIG. 2.

In the third modification depicted in FIG. 11, a tilted side edge portion 26a of a hanger 26 is arranged on a side opposite to the tilted side edge portion 26a in FIG. 9, that is, on a side facing toward the center of the drag strip 20.

In the conventional drag strip 20 shown in FIG. 4 through FIG. 7, the hanger 23 has a turned square U-shaped cross-section when viewed together with the corresponding portion of the sliding main body 21. The drag strip 20 is attached to the inner retainer 5 before assembling sprags 3. The sprags 3 are then assembled. The sprags 3 therefore act as stoppers.

Each hanger 24 or 26 of the drag strip 20 in the one-way clutch according to the one embodiment of the present invention extends at a right angle from the sliding main body 21 and hence has an L-shaped cross-section when viewed together with the corresponding portion of the Sliding main body 21. This configuration of the hanger 24 or 26 permits attachment of the drag strip 20 to the inner retainer 5 subsequent to assembly on the sprags 3 in the inner retainer 5.

Figure 12:
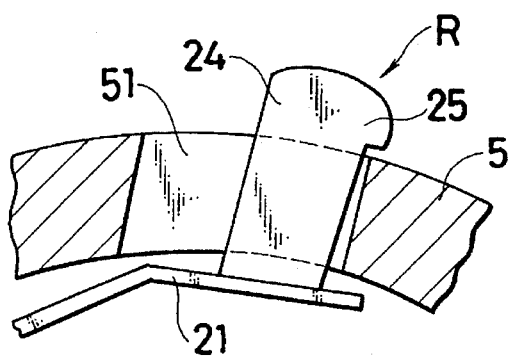
FIG. 12 shows a fourth modification of the hanger depicted in FIG. 2, said fourth modification including a curved profile on a free edge of the hanger.
Figure 13:
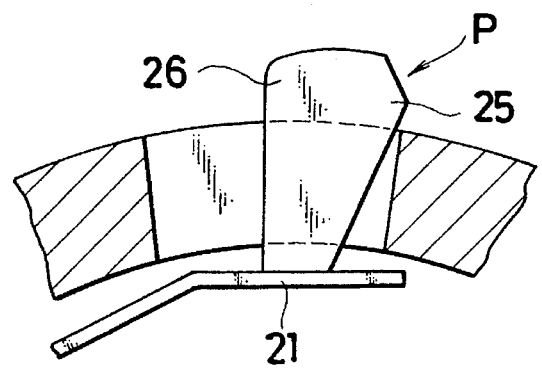
FIG. 13 shows a fifth modification of the hanger according to the first modification depicted in FIG. 9, in which the hanger is chamfered.

In the fourth modification depicted in FIG. 12, a free edge of a hanger 24, said free edge being an upper edge as viewed in FIG. 12 and being indicted by arrow R in the same figure, has a curved profile. In the fifth modification shogun in FIG. 13, a hanger 26 is chamfered at a portion indicated by arrow P, namely, at an upper right corner as viewed in FIG. 13.

Figure 14:
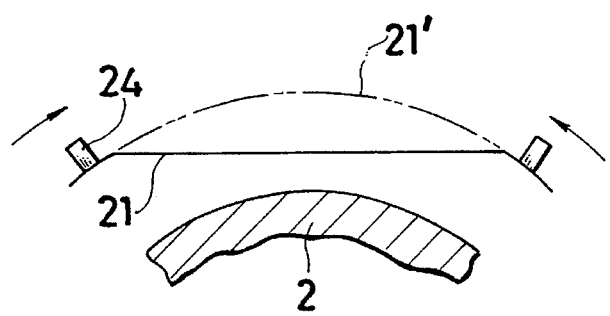
FIG. 14 illustrates displacement of hangers toward a center of a drag strip upon assembly of an inner ring.
Figure 15:
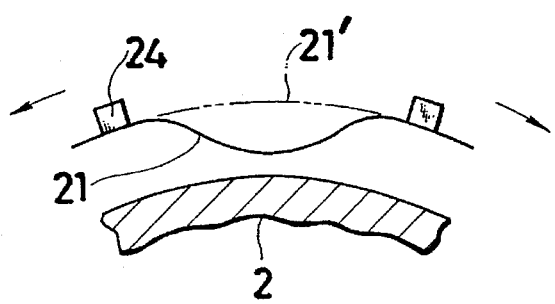
FIG. 15 illustrates displacement of hangers away from a center of a drag strip upon assembly of an inner ring.

FIGS. 14 and 15 each illustrates a change in the shape of a drag strip in a one-way clutch according to the present invention before and after assembly of the inner ring.

FIG. 14 shows hangers with engagement portions extending away from the drag strip as shown in FIGS. 8 and 9. A solid line 21 indicates a sliding main body after its attachment to the inner retainer but before assembly of the inner ring. The solid line 21 is straight A broken line 21', on the other hand, indicates the state of the sliding main body after the inner ring has been assembled. The sliding main body is in an arcuate form so that the hangers 24 have been displaced toward the center of the drag strip as indicated by arrows (see FIG. 8).

FIG. 15 illustrates hangers with engagement portions extending the center of the drag strip as shown in FIGS. 10 and 11. Before assembly of the inner ring, the sliding main body 21 has been attached to the inner retainer in such a shape that the sliding main body 21 presents a inwardly convex arcuate profile as indicated by a solid line. After the inner ring has been assembled, the sliding main body takes a substantially straight profile so that the hangers 24 have been displaced away from the drag strip as indicated by arrows.

In each of these two types of hangers, the hangers are separated from the edges of the corresponding sprag windows when the sliding surface of the sliding main body 21 of the drag strip 20 is pressed by the inner ring 2.

In the first embodiment of the present invention illustrated in FIG. 1, the drag strip 20 is provided at the opposite ends thereof with the hangers 24, respectively. The drag strip 20 may however be provided with only one hanger 24 at one of the opposite ends thereof.

What is claimed is:

1. In a one-way clutch having engagement members for transmitting drive force from one of an outer ring and an inner ring to the other, an inner and outer retainers holding said engagement members in place, a clutch member for selectively maintaining said engagement members in contact with an annular outer wall of said inner ring and an annular inner wall of said outer ring, and a drag strip, said engagement members, inner and outer retainers, clutch member and drag strip being all disposed between said annular outer wall of said inner ring and said annular inner wall of said outer ring, the improvement wherein said drag strip comprises:

a sliding main body for being brought into contact with said annular outer wall of said inner ring, and a hanger extending at a right angle from at least one of opposite ends of said sliding main body into an engagement-member-receiving window of said inner retainer and, on a side edge of said normally maintained in contact with an edge of said engagement-member-receiving window of said inner retainer, having an engagement portion engageable with said edge of said engagement-member-receiving window, said engagement portion being located in the same plane as said side edge of said hanger, whereby said hanger is maintained in engagement with said inner retainer by means of said engagement portion.

2. A one-way clutch according to claim 1, wherein said engagement portion is chamfered at a corner on a free edge thereof, said corner being on a side facing said edge of said engagement-member-receiving window of said inner retainer, so that attachment of said drag strip to said inner retainer is facilitated.

3. A one-way clutch according to claim 1, wherein said hanger has a curved profile on a free edge thereof so that attachment of said drag strip to said inner retainer is facilitated.

4. A one-way clutch according to claim 1, wherein said engagement members are sprags and said clutch member is a ribbon spring.

5. A one-way clutch according to claim 1, wherein said drag strip is provided with an additional hanger of the same type as the first-mentioned hanger at the other end of said sliding main body.

* * * * *